US011354756B2

(12) United States Patent
Jayaram

(10) Patent No.: US 11,354,756 B2
(45) Date of Patent: *Jun. 7, 2022

(54) ENDORSING A PRODUCT PURCHASED OFFLINE

(71) Applicant: GOOGLE LLC, Mountain View, CA (US)

(72) Inventor: Ranjith Jayaram, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 16/407,122

(22) Filed: May 8, 2019

(65) Prior Publication Data

US 2019/0266677 A1 Aug. 29, 2019

Related U.S. Application Data

(63) Continuation of application No. 14/282,661, filed on May 20, 2014, now Pat. No. 10,325,326, which is a
(Continued)

(51) Int. Cl.
*G06Q 10/06* (2012.01)
*G06Q 30/06* (2012.01)
(Continued)

(52) U.S. Cl.
CPC .......... *G06Q 50/01* (2013.01); *G06Q 30/0267* (2013.01); *G06Q 30/0268* (2013.01); *G06Q 30/0282* (2013.01)

(58) Field of Classification Search
CPC ............... G06Q 50/01; G06Q 30/0267; G06Q 30/0268; G06Q 30/0282
(Continued)

(56) References Cited

U.S. PATENT DOCUMENTS 7,174,382 B2 2/2007 Ramanathan et al.
7,644,019 B2 1/2010 Woda et al.
(Continued)

FOREIGN PATENT DOCUMENTS

CN 102045273 A 5/2011
EP 2 179 358 A1 4/2010
(Continued)

OTHER PUBLICATIONS

Maguire "U.S. Office Action issued in copending U.S. Appl. No. 14/337,015, filed Jul. 21, 2014", dated Sep. 5, 2019, 14 pages.
(Continued)

*Primary Examiner* — Jonathan P Ouellette
(74) *Attorney, Agent, or Firm* — Dority & Manning, P.A.

(57) ABSTRACT

An endorsement application can allow a user to endorse a product on a social network website when the product is purchased at a physical merchant point of sale terminal. Users of social network websites have been given the opportunity to endorse products that they have located or purchased online, but purchasers of products in person have not had that opportunity. The endorsement application can operate on a user's mobile device and can recognize a product purchased through near field or other communication using the mobile device. The application can isolate the product identification and product marketing data supplied by the point of sale terminal or other source and offer the user the opportunity to endorse the product on a social network website. If the user endorses the product, the application sends the endorsement to the user's account on the social network website for display to the user's community.

20 Claims, 5 Drawing Sheets

Related U.S. Application Data continuation of application No. 13/402,853, filed on Feb. 22, 2012, now Pat. No. 8,756,168.

(51) Int. Cl.
  *G06Q 30/02* (2012.01)
  *G06Q 50/00* (2012.01)

(58) Field of Classification Search
  USPC .......................................... 705/1.1, 319, 347
  See application file for complete search history.

(56) References Cited

U.S. PATENT DOCUMENTS

| | | | | |
|---|---|---|---|---|
| 7,761,343 | B2* | 7/2010 | Calabria | G06Q 30/0271 |
| | | | | 705/26.1 |
| 7,881,975 | B2* | 2/2011 | Calabria | G06Q 30/0633 |
| | | | | 705/27.1 |
| 8,150,844 | B2 | 4/2012 | Redstone et al. | |
| 8,260,725 | B2* | 9/2012 | Crawford | H04W 4/023 |
| | | | | 705/319 |
| 8,326,769 | B1 | 12/2012 | Weisman | |
| 8,332,314 | B2 | 12/2012 | Griffin | |
| 8,381,969 | B1 | 2/2013 | Miller et al. | |
| 8,498,939 | B1 | 7/2013 | Gupta | |
| 8,499,040 | B2* | 7/2013 | Schoen | G06Q 50/01 |
| | | | | 709/204 |
| 8,515,791 | B2 | 8/2013 | Woda et al. | |
| 8,589,488 | B2* | 11/2013 | Huston | H04L 67/18 |
| | | | | 709/204 |
| 8,621,215 | B1 | 12/2013 | Iyer | |
| 8,626,579 | B2* | 1/2014 | Fordyce, III | G06Q 30/0267 |
| | | | | 705/14.1 |
| 8,655,987 | B2* | 2/2014 | Schoen | G06Q 10/10 |
| | | | | 709/219 |
| 8,700,487 | B2 | 4/2014 | Grass et al. | |
| 8,756,168 | B1 | 6/2014 | Jayaram | |
| 8,788,420 | B1 | 7/2014 | Green et al. | |
| 9,740,360 | B2* | 8/2017 | Schoen | G06Q 30/0269 |
| 9,773,285 | B2* | 9/2017 | Caiman | G06Q 10/00 |
| 2002/0107797 | A1 | 8/2002 | Combaluzier | |
| 2003/0047602 | A1 | 3/2003 | Iida et al. | |
| 2004/0128195 | A1 | 7/2004 | Sorem | |
| 2004/0210527 | A1 | 10/2004 | Woda et al. | |
| 2004/0230527 | A1 | 11/2004 | Hansen et al. | |
| 2007/0121843 | A1 | 5/2007 | Atazky et al. | |
| 2008/0046314 | A1 | 2/2008 | Chung et al. | |
| 2008/0071634 | A1 | 3/2008 | Rampell et al. | |
| 2008/0079539 | A1 | 4/2008 | Daley et al. | |
| 2008/0133402 | A1 | 6/2008 | Kurian et al. | |
| 2008/0270209 | A1 | 10/2008 | Mauseth et al. | |
| 2008/0281726 | A1 | 11/2008 | Gupta | |
| 2008/0313256 | A1 | 12/2008 | Kanazawa et al. | |
| 2009/0119160 | A1 | 5/2009 | Woda et al. | |
| 2009/0119167 | A1 | 5/2009 | Kendall et al. | |
| 2009/0164929 | A1 | 6/2009 | Chen et al. | |
| 2009/0171686 | A1 | 7/2009 | Eberstadt | |
| 2009/0222348 | A1 | 9/2009 | Ransom et al. | |
| 2009/0319359 | A1 | 12/2009 | Soza et al. | |
| 2009/0319940 | A1 | 12/2009 | Flake et al. | |
| 2010/0069058 | A1 | 3/2010 | Rothschild | |
| 2010/0076850 | A1 | 3/2010 | Parekh et al. | |
| 2010/0114775 | A1 | 5/2010 | Griffin | |
| 2010/0114776 | A1 | 5/2010 | Weller et al. | |
| 2010/0125490 | A1 | 5/2010 | Kiciman et al. | |
| 2010/0217670 | A1 | 8/2010 | Reis et al. | |
| 2010/0228664 | A1 | 9/2010 | Peterson et al. | |
| 2010/0257028 | A1* | 10/2010 | Hillerbrand | G06Q 50/01 |
| | | | | 705/319 |
| 2010/0306099 | A1 | 12/2010 | Hirson et al. | |
| 2010/0312649 | A1* | 12/2010 | Lurie | H04L 12/1859 |
| | | | | 705/14.66 |
| 2010/0332330 | A1 | 12/2010 | Goel et al. | |
| 2011/0010234 | A1 | 1/2011 | Lindelsee et al. | |
| 2011/0010244 | A1 | 1/2011 | Hatridge et al. | |
| 2011/0099274 | A1 | 4/2011 | Puthenkulam et al. | |
| 2011/0112957 | A1 | 5/2011 | Ingram et al. | |
| 2011/0131122 | A1 | 6/2011 | Griffin et al. | |
| 2011/0137789 | A1 | 6/2011 | Kortina et al. | |
| 2011/0187642 | A1 | 8/2011 | Faith et al. | |
| 2011/0189981 | A1 | 8/2011 | Faith et al. | |
| 2011/0191200 | A1 | 8/2011 | Bayer et al. | |
| 2011/0264736 | A1 | 10/2011 | Zuckerberg et al. | |
| 2011/0276396 | A1* | 11/2011 | Rathod | H04L 51/066 |
| | | | | 705/14.49 |
| 2011/0307340 | A1 | 12/2011 | Benmbarek | |
| 2012/0059848 | A1 | 3/2012 | Krishnamoorthy | |
| 2012/0084160 | A1 | 4/2012 | Badros et al. | |
| 2012/0089446 | A1 | 4/2012 | Gupta et al. | |
| 2012/0150592 | A1* | 6/2012 | Govrik | G06Q 30/0207 |
| | | | | 705/14.1 |
| 2012/0150598 | A1 | 6/2012 | Griggs | |
| 2012/0150734 | A1 | 6/2012 | Bangah et al. | |
| 2012/0166267 | A1 | 6/2012 | Beatty et al. | |
| 2012/0173320 | A1 | 7/2012 | Kail et al. | |
| 2012/0190386 | A1 | 7/2012 | Anderson | |
| 2012/0191594 | A1 | 7/2012 | Welch et al. | |
| 2012/0203632 | A1* | 8/2012 | Blum | G06Q 30/0633 |
| | | | | 705/14.53 |
| 2012/0023370 | A1 | 9/2012 | Kidron | |
| 2012/0233020 | A1 | 9/2012 | Eberstadt et al. | |
| 2012/0239479 | A1 | 9/2012 | Amaro et al. | |
| 2012/0239497 | A1 | 9/2012 | Nuzzi | |
| 2012/0278127 | A1 | 11/2012 | Kirakosyan et al. | |
| 2012/0303425 | A1 | 11/2012 | Katzin et al. | |
| 2012/0323938 | A1 | 12/2012 | Skeen et al. | |
| 2013/0030950 | A1 | 1/2013 | Leng | |
| 2013/0054447 | A1 | 2/2013 | Ross et al. | |
| 2013/0055300 | A1 | 2/2013 | Hanina | |
| 2013/0060617 | A1 | 3/2013 | Ross et al. | |
| 2013/0185189 | A1 | 7/2013 | Stewart | |
| 2013/0204744 | A1 | 8/2013 | Grass et al. | |
| 2013/0211891 | A1* | 8/2013 | Daniel | G06Q 50/01 |
| | | | | 705/14.16 |
| 2013/0325592 | A1 | 12/2013 | Woda et al. | |
| 2013/0332357 | A1 | 12/2013 | Green et al. | |
| 2014/0136432 | A1 | 5/2014 | Fallows | |
| 2015/0032610 | A1 | 1/2015 | Crowley et al. | |

FOREIGN PATENT DOCUMENTS

| | | |
|---|---|---|
| EP | 2 404 264 A1 | 1/2012 |
| EP | 2 663 957 A2 | 11/2013 |
| KR | 10-0861215 B1 | 9/2008 |
| KR | 10-2009-0036896 A | 4/2009 |
| KR | 10-2011-0075933 A | 7/2011 |
| KR | 10-1078173 B1 | 10/2011 |
| KR | 10-2012-0119813 A | 10/2012 |
| KR | 10-2012-0121452 A | 11/2012 |
| WO | 2009/026395 A1 | 2/2009 |
| WO | 2009/048299 A2 | 4/2009 |
| WO | 2010/099632 A1 | 9/2010 |
| WO | 2012/097171 A2 | 7/2012 |
| WO | 2013/184947 A2 | 12/2013 |
| WO | 2013/184347 A3 | 3/2014 |
| WO | 2014/075105 A1 | 5/2014 |
| WO | 2013/184947 A8 | 7/2014 |

OTHER PUBLICATIONS

U.S. Appl. No. 13/402,853 to Ranjith Jayaram, filed Feb. 22, 2012.
U.S. Appl. No. 14/282,661 to Ranjith Jayaram, filed May 20, 2014.
U.S. Appl. No. 13/490,423 to Travis Harrison Kroll Green et al., filed Jun. 6. 2012.
U.S. Appl. No. 13/652,443 to Travis Harrison Kroll Green et al., filed Oct. 15, 2012.
U.S. Appl. No. 14/337,015 to Travis Hanison Kroll Green et al., filed Jul. 21, 2014.
U.S. Appl. No. 13/674,880 to Thomas Mackenzie Fallows, filed Nov. 12, 2012.
U.S. Appl. No. 14/243,452 to Shravan Rayanchu, filed Apr. 2, 2014.
Baharlou "International Preliminary Report on Patentability issued

(56) References Cited

OTHER PUBLICATIONS in International Application No. PCT/US2013/044565", dated Dec. 18, 2014, 10 pages.
Cain "New Like Button Features Mean More Opportunities for Liking", Sep. 9, 2010, 1 page.
Jacob "U.S. Office Action issued in copending U.S. Appl. No. 14/243,452, filed Apr. 2, 2014", dated Jun. 14, 2017, 14 pages.
Jacob "U.S. Office Action issued in copending U.S. Appl. No. 14/243,452, filed Apr. 2, 2014", dated Dec. 8, 2017, 15 pages.
Jacob "U.S. Office Action issued in copending U.S. Appl. No. 14/243,452, filed Apr. 2, 2014", dated Jul. 24, 2018, 13 pages.
Jacob "U.S. Office Action issued in copending U.S. Appl. No. 14/243,452, filed Apr. 2, 2014", dated Feb. 13, 2019, 17 pages.
Kim "International Search Report and Written Opinion issued in International Application No. PCT/US2013/044565", dated Nov. 18, 2013, 11 pages.
Kim "International Search Report and Written Opinion issued in International Application No. PCT/US2013/069759", dated Mar. 11, 2014, 10 pages.
Kwong "U.S. Office Action issued in copending U.S. Appl. No. 13/490,423, filed Jun. 6, 2012", dated Sep. 14, 2012, 17 pages.
Kwong "U.S. Office Action issued in copending U.S. Appl. No. 13/490,423, filed Jun. 6, 2012", dated Aug. 13, 2014, 23 pages.
Kwong "U.S. Office Action issued in copending U.S. Appl. No. 13/490,423, filed Jun. 6, 2012", dated Jul. 8, 2015, 25 pages.
Kwong "U.S. Office Action issued in copending U.S. Appl. No. 13/490,423, filed Jun. 6, 2012", dated Feb. 28, 2013, 21 pages.
Kwong "U.S. Office Action issued in copending U.S. Appl. No. 13/490,423, filed Jun. 6, 2012", dated Dec. 3, 2014, 24 pages.
Madamba "U.S. Office Action issued in copending U.S. Appl. No. 13/436,817, filed Mar. 30, 2012", dated Aug. 16, 2012, 16 pages.
Maguire "U.S. Office Action issued in copending U.S. Appl. No. 13/652,443, filed Oct. 15, 2012", dated May 15, 2013, 9 pages.
Maguire "U.S. Office Action issued in capending U.S. Appl. No. 13/552,443, filed Oct. 15, 2012", dated Sep. 6, 2013, 9 pages.
Maguire "U.S. Office Action issued in copending U.S. Appl. No. 14/337,015, filed Jul. 21, 2014", dated May 22, 2018, 17 pages.
Maguire "U.S. Office Action issued in copending U.S. Appl. No. 14/337,015, filed Jul. 21, 2014", dated Jan. 26, 2018, 18 Pages.
Maguire "U.S. Office Action issued in copending U.S. Appl. No. 14/337,015, filed Jul. 21, 2014", dated Aug. 24, 2017, 20 pages.
Maguire "U.S. Office Action issued in copending U.S. Application No. 14/337,015, filed Jul. 21, 2014", mailed on Feb. 14, 2017, 19 pages.
Maguire "U.S. Office Action issued in copending U.S. Appl. No. 14/337,015, filed Jul. 21, 2014", dated May 22, 2017, 20 pages.
Maguire "U.S. Office Action issued in copending U.S. Application No. 14/337,015, filedJul. 21, 2014", dated Sep. 20, 2016, 14 pages.
Maguire "U.S. Office Action issued In copending U.S. Appl. No. 14/337,015, filed Jul. 21, 2014", dated Dec. 10, 2018, 19 pages.
Merchant "U.S. Office Action issued in copending U.S. Appl. No. 13/436,817, filed Mar. 30, 2012", dated May 17, 2012, 19 pages.
Mohri "International Preliminary Report on Patentability issued in International Application No. PCT/US2013/069759", dated May 21, 2015, 7 pages.
Ouellette "U.S. Office Action issued in copending U.S. Appl. No. 13/402,853, filed Feb. 22, 2012", dated Aug. 14, 2013, 12 pages.
Ouellette "U.S. Office Action issued in copending U.S. Appl. No. 14/282,661, filed May 20, 2014", dated Oct. 26, 2017, 14 pages.
Ouellette "U.S. Office Action issued in copending U.S. Appl. No. 14/282,661, filed May 20, 2014", dated Jan. 2, 2019, 5 pages.
Ouellette "U.S. Office Action issued in copending U.S. Appl. No. 14/282,661, filed May 20, 2014", dated May 10, 2018, 15 pages.
Pratt "U.S. Office Action issued in copending U.S. Appl. No. 13/674,880, filed Nov. 12, 2012", dated Sep. 5, 2018, 22 pages.
Pratt "U.S. Office Action issued in copending U.S. Appl. No. 13/674,880, filed Nov. 12, 2012", dated Mar. 26, 2018, 30 pages.
Pratt "U.S. Office Action issued in copending U.S. Appl. No. 13/674,880, filed Nov. 12, 2012", dated Feb. 14, 2017, 42 pages.
Pratt "U.S. Office Action issued in copending U.S. Appl. No. 13/674,880, filed Nov. 12, 2012", dated Dec. 24, 2014, 11 pages.
Pratt "U.S. Office Action issued in copending U.S. Appl. No. 13/674,880, filed Nov. 12, 2012", dated Sep. 28, 2016, 33 pages.
Pratt "U.S. Office Action issued in copending U.S. Appl. No. 13/674,880, filed Nov. 12, 2012", dated Jul. 16, 2015, 22 pages.
Richardson "Best Practices: Using Facebook Effectively in Your Marketing Mix (Part 2)", Mar. 31, 2011, 2 pages.
Rintel "Are Facebook and Google+ Limiting Your Opinions", Aug. 29, 2012, 9 pages.
Maguire, "U.S. Office Action issued in copending U.S. Appl. No. 14/337,015, filed Jul. 21, 2014", dated Jun. 11, 2019, 13 pages.

* cited by examiner

ENDORSING A PRODUCT PURCHASED OFFLINE

CROSS REFERENCE TO RELATED APPLICATION

This application is a continuation of and claims priority to U.S. patent application Ser. No. 14/282,661, filed May 20, 2014, and entitled "Endorsing A Product Purchased Offline," which is a continuation of U.S. patent application Ser. No. 13/402,853, filed Feb. 22, 2012, and entitled "Endorsing A Product Purchased Offline," now U.S. Pat. No. 8,756,168. The complete disclosure of the above-identified priority applications is hereby fully incorporated herein by reference.

TECHNICAL FIELD

This present disclosure relates generally to social networking website marketing, and more particularly to a method for using social networking websites to endorse a product that is purchased offline, for example, via a Near Field Communication ("NFC") transaction.

BACKGROUND

Social Networking Websites ("SNW") have been increasingly popular since the advent of the Internet. Most SNW products are web based and allow users to interact over the Internet with others who share a common interest. The SNW can allow a user or a group of users to develop a web page that represents themselves to other users, such as a profile. The profile page is typically populated with information about the user of interest to the readers of a particular SNW. The information can include hobbies, interests, career highlights, social interactions, and other details relevant to the community on that particular SNW.

More recently, one profile component that is becoming common across SNW's is the endorsement feature. The endorsement feature allows a user to endorse a product, service, website, news article, blog, business, organization, or any other item or entity (collectively referred to as a "product"). The SNW can allow a user on the Internet to endorse a product that he or she would like to share with, and recommend to, his SNW community. The endorsement can display information on the user's profile page about the product, including a link to a website, pictures of a product, and marketing information about a product. The endorsement can allow the user to express his recommendation of a product and additionally allow marketing information about a product to be communicated to all of the user's SNW community.

The online websites of many products have virtual buttons displayed on the website to allow a user to endorse their product. The button can be programmed to initiate an endorsement to be sent to a particular SNW. When actuated, the button will transmit the endorsement and any related marketing information or other product metadata to the profile of the user. Additionally, the website will increment a counter displayed on the website to show the number of endorsements received for the product. Examples of a virtual endorsement feature include the "Like" button on FACE-BOOK and the "+1" button on GOOGLE+. In further examples, website controls can allow a user to "like" or "dislike" a product, select "Plus 1" to indicate a favorable view of the product, "share" a webpage (or product or other information on a webpage or other electronic document), or "tweet" a favorable or unfavorable view of the product.

The current limitation of the endorsement technology is that the endorsement buttons have primarily been limited to websites or other locations on the Internet accessible by the user's online browsing. If a user chooses to endorse a physical product and share it with his community, the user would have to find a webpage for that product and hope an endorsement feature is located on the page. A common target for user endorsements occurs when a user purchases a product. A user can often want to share his selection and information about the purchase on his profile page. With an online purchase, sharing and recommending a product is as simple as actuating the endorsement feature. Unfortunately, the popular endorsement feature is not available when products are purchased at a physical merchant location.

SUMMARY

An aspect of the present invention provides a computer-implemented method for endorsing a product purchased through a Near Field Communication ("NFC") or other offline transaction. An Endorsement Application ("EA") transmits the user's endorsement of a purchased product to a Social Network Website ("SNW") employed by a user. When a user purchases a product via NFC, the merchant Point Of Sale ("POS") terminal communicates with the user's device to complete the transaction. When the user makes a purchase, the EA can recognize the purchase and offer the user an option to endorse one or more of the purchased products. If the user chooses to endorse the product, the user can actuate the endorsement feature, and the EA can submit the endorsement to a profile page of the user located on an SNW. The EA can transmit the product metadata to the SNW profile page for display. The product metadata can be provided to the POS terminal by a Product Marketing System ("PMS") of the product that is purchased. If the quantity of product metadata becomes cumbersome for the POS terminal to quickly transmit, the EA can recognize that product metadata is not available from the POS terminal and can alternatively communicate directly with the PMS to obtain the product metadata.

Another aspect of the present invention provides a computer program product for endorsing a product obtained through an NFC or other offline transaction. The computer program product includes a non-transitory computer-readable storage device having computer-readable program instructions embodied thereon. The computer-readable program instructions include computer program instructions for transmitting the user's endorsement of a purchased product to a Social Network Website ("SNW") employed by a user, by communicating, between the POS terminal and the user's device to complete the transaction; communicating an option to the user to endorse the product purchased by the mobile device; submitting the endorsement to a profile page of the user located on a SNW when the endorsement feature is actuated; and transmitting the product metadata to the SNW profile page for display.

Another aspect of the present invention provides an apparatus for endorsing a product purchased through an NFC or other offline transaction. The apparatus includes a web browser application with an EA logically coupled to the web browser application. The EA is configured for transmitting the user's endorsement of a purchased product to the user's Social Network Website ("SNW") by recognizing a completed transaction; offering an option to the user to endorse the product purchased by the mobile device; submitting the endorsement to a profile page of the user located on a SNW when the endorsement feature is actuated; and transmitting the product metadata to the SNW profile page for display.

DETAILED DESCRIPTION OF THE EXEMPLARY EMBODIMENTS

Overview

Figure 1:
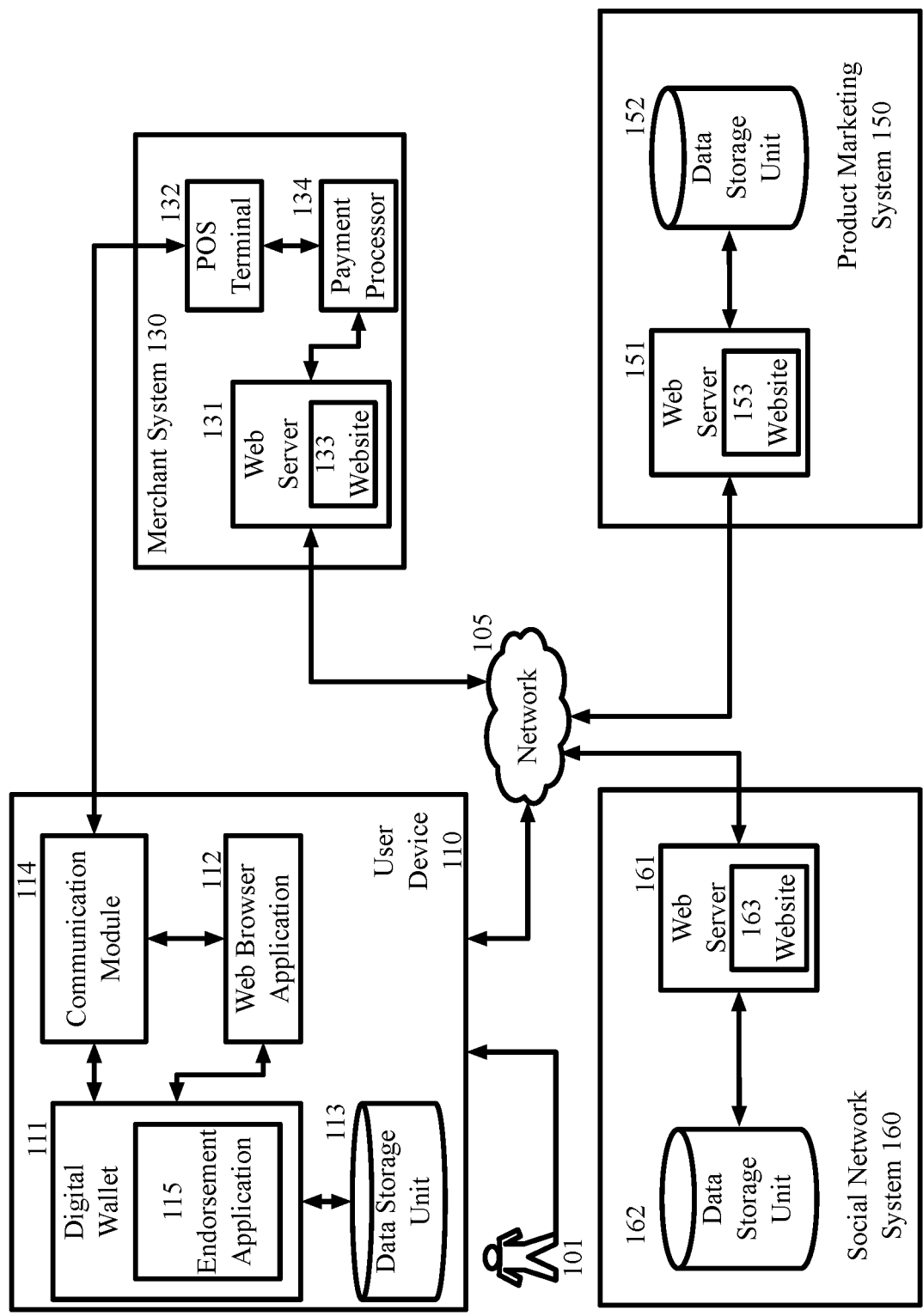
FIG. 1 is a block diagram depicting an operating environment of an system for endorsing a product purchased in an offline transaction, in accordance with certain exemplary embodiments.

The exemplary embodiments provide an Endorsement Application ("EA") that can allow a user to endorse one or more products purchased via Near Field Communication ("NFC") with a mobile device. Users can share a significant purchase or a great deal with those in the user's online community. A user can share the product by actuating an endorsement feature on his mobile device to recommend the product on his profile page on a Social Networking Website ("SNW"). The EA can be installed on the user's device and the Point Of Sale ("POS") terminal at a merchant that provides the transaction. The EA can provide a user interface for entering configuration information. The user can input into the EA one or more of the SNWs that the user employs. To complete a purchase at a merchant location, the mobile device can communicate with the POS terminal via NFC technology or other applicable technologies (for example, a Wi-Fi, BLUETOOTH, infrared, or other suitable communication technology). The EA can recognize that the user device is making an NFC purchase and monitor the transaction and search for product identification to be used for endorsement. When the product is identified, the EA can gather the product details from the POS terminal. The POS terminal can supply the product details and can further supply product metadata to the EA. The product metadata can comprise of pictures of the product, links to the product website, coupons, or other marketing collateral that can enhance the popularity of the product.

The EA can provide the user with an endorsement feature that will allow the user to actuate the feature or ignore it. The feature can give the option to endorse the product on one or more SNWs. When the user chooses to endorse a product, the EA can then transmit the product metadata of the endorsed product to the SNW for displaying on the user's profile on the SNW and on the news feed or streams of the connections of the user. In an alternative embodiment of the invention, the EA can communicate with the Product Marketing System ("PMS") of the product to solicit product marketing information. The PMS can supply the marketing information to the EA for transmission to the SNW or can transmit it directly to the SNW.

In an alternative exemplary embodiment of the invention, the EA can gather the product identification and product metadata and store it for later use. That is, when a user makes an NFC purchase, the EA will gather the specific product identification and store it in a file on the user device for later user review. The user can then review a list of recent purchases and determine whether to endorse one or more of the products. At the time of purchase, the POS can transmit the product metadata to the EA. The EA can then transmit that data to the SNW when the user endorses the product. Alternatively, at the time of purchase, the POS can only transmit product identification data to the EA. The EA can then communicate with the Product Marketing System ("PMS") of the product to solicit product metadata. The PMS can supply the product metadata to the EA for transmission to the SNW or can transmit it directly to the SNW.

The EA can be embodied as a stand-alone application program or as a companion program to a web browser, for example, as a companion program to a Hypertext Markup Language revision 5 ("HTML5") compliant web browser or other type of web browser having messaging and storage capabilities. While certain embodiments are described in which parts of the EA are implemented in software, it will be appreciated that one or more acts or functions of the EA can be performed by hardware, software, or a combination thereof, as can be embodied in one or more computing systems.

The inventive functionality of the invention will be explained in more detail in the following description, read in conjunction with the figures illustrating the program flow.

Turning now to the drawings, in which like numerals represent like (but not necessarily identical) elements throughout the figures, exemplary embodiments of the present invention are described in detail.

System Architecture

FIG. 1 is a block diagram depicting an operating environment 100 for endorsing a product when purchasing the product offline with a mobile device, in accordance with certain exemplary embodiments.

Referring to FIG. 1, the exemplary operating environment 100 includes one or more merchant systems 130, one or more Product Marketing Systems ("PMS") 150, one or more social network systems 160, and one or more user network devices 110 each associated with a respective user 101.

Each merchant system 130, PMS 150, social network system 160, and user device 110 includes a network device configured to communicate via a distributed network 105. For example, each merchant system 130, PMS 150, social network system 160, and user device 110 can include a server, desktop computer, laptop computer, tablet computer, smartphone, handheld computer, personal digital assistant ("PDA"), or any other wired or wireless, processor-driven device.

The network 105 includes a wired or wireless telecommunication system or device by which network devices (including devices 130, 150, 160, and 110) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, near field communication, or any combination thereof or any other appropriate architecture or system that facilitates the communication of signals, data, and/or messages. Throughout the discussion of exemplary embodiments, it should be understood that the terms "data" and "information" are used interchangeably herein to refer to text, images, audio, video, or any other form of information that can exist in a computer based environment.

The user device 110 can be a mobile device, (for example, notebook computer, tablet computer, netbook computer, personal digital assistant (PDA), video game device, GPS locator device, cellular telephone, smartphone, or other mobile device), or other appropriate technology The user device 110 can include or can be coupled to a web browser application module 112 or other suitable application, such as a digital wallet application 111 an endorsement application 115.

The user 101 can use the web browser application 112 or other application to view, download, upload, or otherwise access documents or web pages via the distributed network 105.

The web browser application 112 or other application can interact with web servers (or other computing devices) connected to the network 105, such as web server 131 of the merchant system 130, web server 151 of the PMS 150, and the web server 161 of the social network system 160.

The user device 110 includes a digital wallet application module 111. The digital wallet 111 can encompass any application, hardware, software, or process the user device 110 can employ to assist the device to complete a purchase transaction, such as an online transaction, or an offline transaction at a point of sale terminal 132 of the merchant system 130. For example, the digital wallet 111 can communication transaction information between the POS terminal 132 via a communication module 114. The digital wallet 111 can interact with the web browser application 112 or can be embodied as a companion application of the web browser application 112. As a companion application, the digital wallet 111 executes within the web browser application 112. That is, the digital wallet 111 can be an application program embedded in the web browser application 112.

The user device 110 includes the endorsement application ("EA") 115. The EA 115 can interact with the web browser application 112 or be embodied as a companion application of the web browser application 112 and execute within the web browser application 112. The EA 115 can further be embodied as a companion application of the digital wallet 111 and execute within the digital wallet 111. The EA 115 can employ a software interface that can open in the digital wallet application 111 or can open in the web browser application 112. The interface can allow the user 101 to select the SNW 163 account or accounts to which the EA 115 will be transmitting an endorsement.

The EA 115 stored in the digital wallet 111 can be used to send product endorsement information to the SNW 163. Each SNW 163 (operating on the web server 161) that the user can belong to and utilize can include a set of computer-readable program instructions, for example, using JavaScript, that enable the SNW 163 to interact with the EA 115 to receive the endorsement information.

The user device 110 includes a data storage unit 113 accessible by the digital wallet 111, the web browser application 112, and other applications. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 includes an NFC communication module 114 that can be accessible by the EA 115, the digital wallet 111, and the web browser application 112. The NFC module 114 can be utilized at the environment of a physical merchant 130 when a user 101 indicates a desire to purchase one or more products. As used throughout the specification, the term "products" should be interpreted to include tangible and intangible products, as well as services. After the user 101 has indicated a desire to purchase the product(s), the merchant system 130 can present a user interface in the form of a POS terminal 132 to receive payment information from the user 101. The NFC communication module 114 can interact with the POS terminal 132 within the merchant environment 130 to allow the user device 115 to complete the sale.

Although described as an NFC communication module 114 in the exemplary embodiment of FIG. 1, the communication module 114 can employ any suitable communication technologies to communicate with the POS terminal 132. Technologies available for communication can include, but are not limited to, NFC, BLUETOOTH, Wi-Fi, infrared, or other suitable communication technology. The NFC communication module 114 can encompass the software and hardware capacity required for communicating in the selected manner with the POS terminal 132.

The merchant system 130 includes a payment processor 132 logically coupled to the web server 131. The payment processor 132 can receive payment information via the POS terminal 132 and interact with a financial institution to authorize payment information.

The social network system 160 utilizes a social network system server 161. The social network server 161 can represent the computer-implemented system that the social network system 160 employs to host the SNW 163 and all of the profiles and communities that use the SNW 163. The SNW 163 can represent any web-based community that allows users to interact over the Internet with others who typically share a common interest. Examples of the SNWs 163 that the user 101 can belong to or interact with include, but are not limited to, FACEBOOK, GOOGLE+, LINKEDIN, and TWITTER. The SNW 163 can allow a user or a group to develop a web page that represents themselves to other users, such as a profile. A user 101 typically populates his profile page with information about themselves that would be of interest to the readers of a particular SNW 163. The information might include hobbies, interests, personal interactions, employment updates, or other details that might be relevant to the community using that particular SNW 163. The SNW 163 can employ an endorsement feature that can allow a user to endorse a product service, website, news article, blog, business, organization, or any other item or entity (collectively referred to as a "product"). The SNW 163 can allow a user that is using the Internet to endorse a product that he or she would like to share with and recommend to his SNW community. The social network system server 161 can communicate with a PMS 150, merchants 130, and user devices 110 via any suitable technologies. These technologies include, but are limited to, an Internet connection via the network 105, email, text, instant messaging, or other suitable communication technologies. The social network system 160 includes a data storage unit 162 accessible by the server 161 of the social network system 160. The data storage unit 162 can include one or more tangible computer-readable storage devices.

The PMS 150 can transmit product marketing data and other product metadata to the POS terminal 132, the EA 115, or directly to the SNW 163. The PMS 150 can employ a web server 151. The PMS server 151 can represent the computer implemented system that the PMS 150 employs to host the PMS website 153. The PMS website 153 can supply product metadata for the SNW 162 to use when displaying an endorsement on a user's 101 profile page on the SNW 162. The product metadata supplied by the PMS website 153 can include pictures, website addresses, videos, coupons, or other informational or advertising data. The PMS 150 includes a data storage unit 152 accessible by the server 151 of the PMS 150. The data storage unit 152 can include one or more tangible computer-readable storage devices.

It will be appreciated that the network connections shown are exemplary and other means of establishing a communications link between the computers and devices can be used. Additionally, those having ordinary skill in the art having the benefit of the present disclosure will appreciate that the merchant system 130, PMS 150, social network system 160, and the user device 110 illustrated in FIG. 1 can have any of several other suitable computer system configurations. For example, a user device 110 embodied as a mobile phone or handheld computer may not include all the components described above or may include additional components.

System Process

The components of the exemplary operating environment 100 are described hereinafter with reference to the exemplary methods illustrated in FIGS. 2-5.

Figure 2:
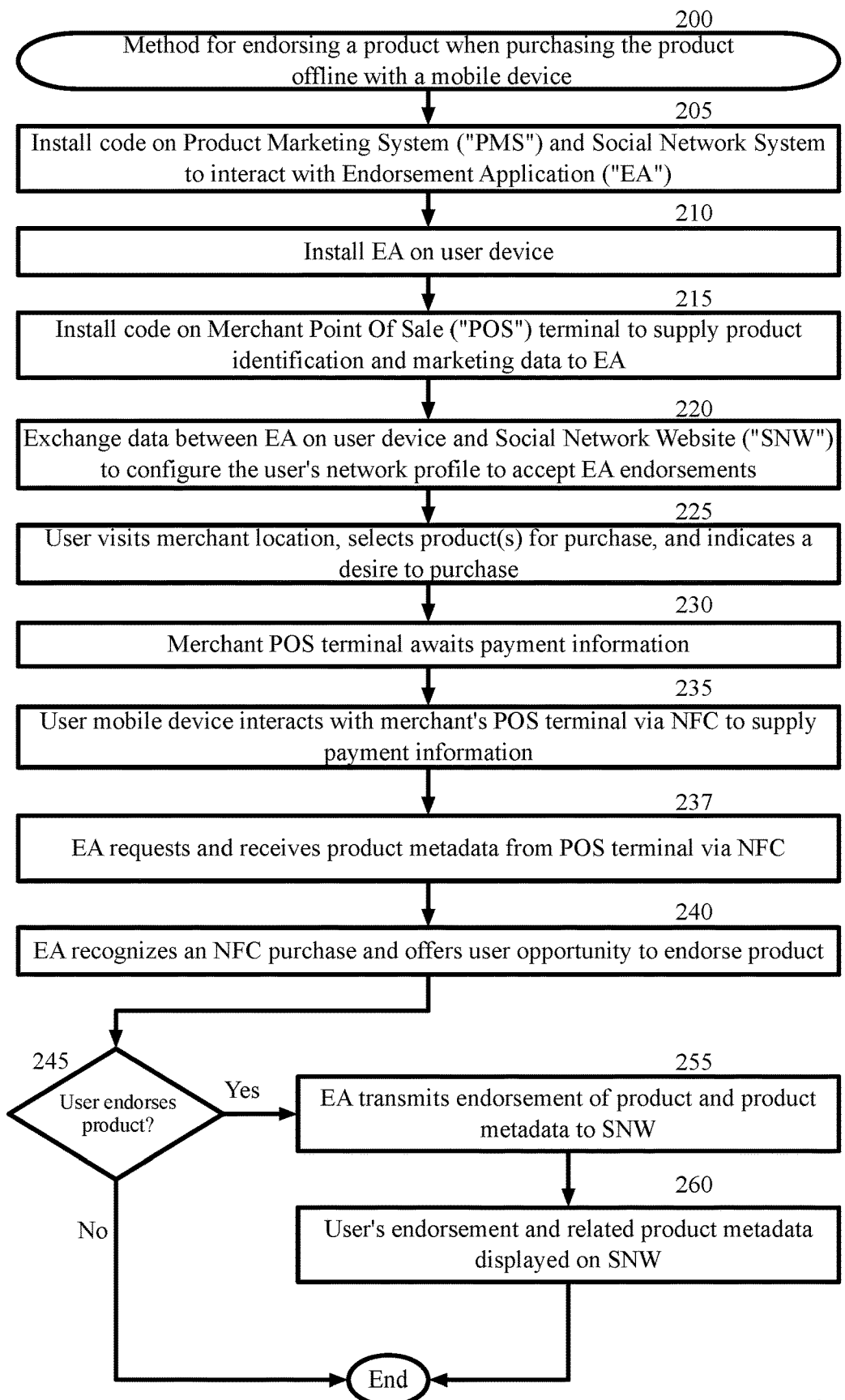
FIG. 2 is a block flow diagram depicting a method for endorsing a product purchased in an offline transaction, in accordance with certain exemplary embodiments.

FIG. 2 is a flow chart depicting a method 200 for endorsing one or more products when purchasing the product offline with a mobile device, in accordance with certain exemplary embodiments. With reference to FIGS. 1 and 2, in block 205, the Product Marketing System ("PMS") 150 can install computer-readable program instructions on the PMS server 151 for interacting with the Endorsement Application ("EA") 115 on the user device 110. Further, the social network system 160 installs computer-readable program instructions on the social network system server 161 for interacting with the EA 115 on the user device 110. In an exemplary embodiment, these computer-readable program instructions can be implemented as an embedded script, such as JavaScript, in the PMS server 151 and the social network system server 161. The instructions installed on the PMS server 151 can allow the PMS server 151 to recognize a request from an EA 115 for product metadata to be transmitted to the EA 115 or transmitted directly to the Social Network Website ("SNW") 163. The instructions on the social network system server 161 can allow the SNW 163 to recognize and utilize an endorsement being sent by the EA 115 and, additionally or alternatively, product metadata being sent by the PMS 150.

In block 210, the user 101 installs an EA 115 on the user device 110. In certain exemplary embodiments, the user 101 can navigate to a website of a provider of the EA 115 and download and install the EA 115. The website that provides the EA 115 can be the SNW 163 to which the user 101 belongs. The EA 115 can be embedded in a digital wallet 112 on a user device 110. The user 101 can utilize a user interface of the EA 115 to assign an SNW 163 to which the endorsement is to be sent. As each SNW 163 can employ a different endorsement feature, the EA 115 can allow the user 101 to select the endorsement feature that corresponds to the user's preferred SNW 163. Examples of these endorsement features might include the "Like" button on FACEBOOK and the "+1" button on GOOGLE+.

In block 215, the merchant system 130 installs computer-readable program instructions on the Point Of Sale ("POS") terminal 132 to instruct the POS 132 terminal to communicate with the EA 115. The POS terminal 132 can be configured to recognize requests from the EA 115 to submit product metadata to the EA 115. The POS terminal 132 can further be configured to identify the purchased product via similar methods employed by the merchant for pricing and billing. For example, the POS terminal 132 can identify a product by the barcode supplied by the manufacturer of the product, the tag number supplied by the merchant, selected from a list by the merchant operating the POS terminal 132, or any other method utilized to identify a product. The POS terminal 132 can install and store product metadata from the Product Marketing System 150.

In block 220, the user 101 navigates to the SNW 163 using the web browser application 112 and communicates with the computer-readable program instructions on the SNW 163. The user 101 can configure his account to accept endorsements from the EA 115. The EA 115 can additionally install or update the endorsement feature to be displayed on the mobile device to remain consistent with the online endorsement features.

In block 225, the user 101 visits the location of the merchant 130 and selects one or more products to purchase. The merchant 130 location can be a physical store or marketplace. The user 101 further indicates a desire to purchase one or more products. For example, the user 101 can select a product or products of the merchant 130 and take the product(s) to the POS terminal 132 for checkout.

In block 230, the merchant 130 inputs the purchase details into the POS terminal 132. The purchase details can include the purchase price of the products, the applicable taxes, the total charges, or other relevant transaction data. The POS terminal awaits payment information from the user 101.

In block 235, the user 101 can employ the user device 110 to interact with the POS terminal 132 via NFC to supply payment information. One skilled in the art would recognize that other suitable communication technologies, in addition to or in connection with NFC communication, can be used by the communication module 114 on the user device 110 to communicate to the POS terminal 132. Technologies available for communication can include, but are not limited to, NFC, BLUETOOTH, Wi-Fi, infrared, or other suitable communication technology. The NFC communication with the POS terminal 132, can be initiated by the user 101 in any manner accepted by the user device 110. The accepted manner of initiation can include actuating a physical or virtual button, a swipe or "tap" of the device, a voice command, or other suitable input.

In block 237, the EA 115 requests additional product identification and product metadata from the POS terminal 132. The EA 115 can use the same technology employed by the user device 110 to make the transaction or it can use an alternate technology to communicate the request with the POS terminal 132. Other technologies for the communication can include, but are not limited to, NFC, BLUETOOTH, Wi-Fi, infrared, or other suitable communication technology. Additionally, in block 250, the POS terminal 132 can transmit product identification and product metadata to the EA 115 on the user device 110. In certain embodiments, the POS terminal 132 can supply the EA 115 with instructions to gather the product metadata from a website or other online location of the PMS server 151. The EA 115 may store the product metadata on the user device 110, in the digital wallet 111 account, on the user account on the SNW 163, or on any other device or server accessible by the user device 110.

In block 240, the EA 115 on the user device 110 recognizes that the user device 110 has been used to make a purchase and can offer the user 101 an opportunity to endorse the product on the SNW 163 of the user 101. The EA 115 can scan the transaction details for the identity of one or more of the purchased products. The EA 115 can additionally or alternatively query the POS terminal 132 for product metadata. After identifying a product, the EA 115 presents the identification of the product to the user 101 with an opportunity to endorse the product.

In block 245, if the user 101 chooses to endorse the identified product, the method 200 follows the "YES" branch to block 255. Otherwise, the method 200 follows the "NO" branch and the method 200 ends.

Following the "YES" branch of block 245 to block 255, the EA 115 transmits a product endorsement to the SNW 163. With the endorsement, the EA 115 can transmit the product identification and the product metadata to the SNW 163. The transmission can be made via any available technology including, but not limited to, an Internet connection via the network 105, text, email, or a cellular connection.

In block 260, the SNW 163 displays the endorsement of the product on the profile page of the user 101. The SNW 163 may also display the endorsement on the streams or news feeds belonging to the connections of the user 101. The streams or news feeds of the connections display updates of the user 101, including endorsed products. Each SNW 163 can display endorsements in the preferred manner of that SNW 163. The endorsement display by the SNW 163 can employ as much or as little of the transmitted information as the SNW 163 chooses. For example, an SNW 163 can display the endorsement on the profile page of the user 101 and include any or all of the product metadata supplied by the EA 115 and the PMS 150 including videos, games, coupons, or other suitable marketing data. An SNW 163 can choose to only include a picture of the product or a link to the product's website or simply a list of endorsed products.

Figure 3:
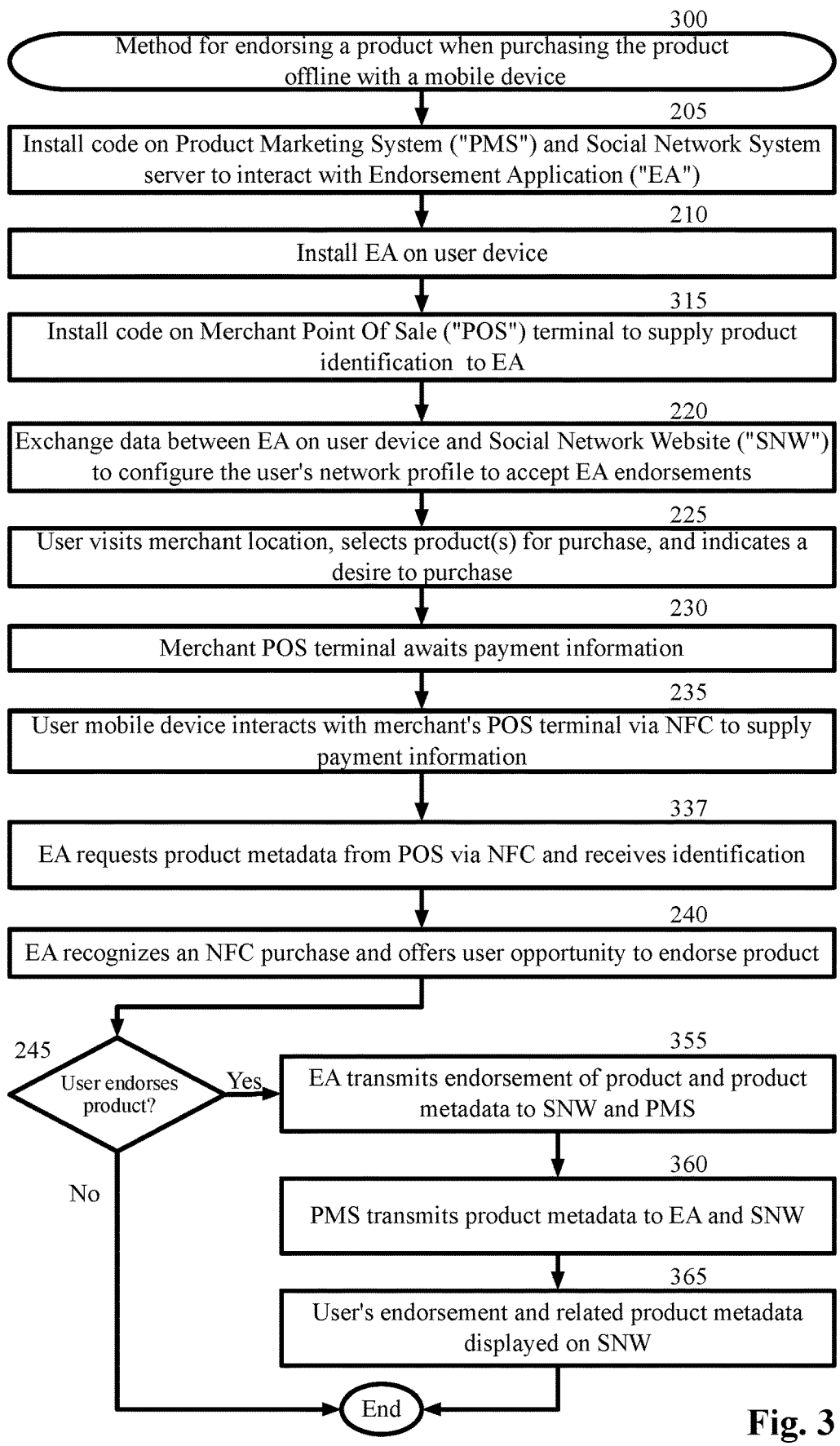
FIG. 3 is a block flow diagram depicting a method for endorsing a product purchased in an offline transaction, according to an alternative exemplary embodiment.

FIG. 3 is a flow chart depicting a method 300 for endorsing a product when purchasing the product offline with a mobile device, in accordance with an alternative exemplary embodiment.

With reference to FIGS. 1 and 2, in block 205 of method 300, the PMS 150 installs computer-readable program instructions on the PMS server 151 for interacting with the EA 115 on the user device 110. Further, the social network system 160 can install computer-readable program instructions on the social network system server 161 for interacting with the EA 115 on the user device 110. In an exemplary embodiment, these computer-readable program instructions can be implemented as an embedded script, such as JavaScript, in the PMS server 151 and the social network system server 161. The instructions installed on the PMS server 151 can allow the PMS server 151 to recognize a request from an EA 115 for product metadata to be transmitted to the EA 115 or directly to the SNW 163. The instructions on the social network system server 161 can allow the SNW 163 to recognize and utilize an endorsement being sent by the EA 115 and, additionally or alternatively, product metadata being sent by the PMS 150.

In block 210, the user 101 installs an EA 115 on the user device 110. In certain exemplary embodiments, the user 101 can navigate to a website of a provider of the EA 115 and download and install the EA 115. The website that provides the EA 115 can be the SNW 163 to which the user 101 belongs. The EA 115 can be embedded in a digital wallet 112 on a user device 110. The user 101 can utilize a user interface of the EA 115 to assign an SNW 163 to which the endorsement is to be sent. As each SNW 163 can employ a different endorsement feature, the EA 115 can allow the user 101 to select the endorsement feature that corresponds to his preferred SNW 163. Examples of these endorsement features might include the "Like" button on FACEBOOK and the "+1" button on GOOGLE+.

In block 315, the merchant system 130 installs computer-readable program instructions on the Point Of Sale ("POS") terminal 132 to instruct the POS 132 terminal to communicate with the EA 115. The POS terminal 132 can be configured to recognize requests from the EA 115 to submit product identification to the EA 115. The POS terminal 132 can additionally be configured to identify the purchased product via similar methods employed by the merchant for pricing and billing. For example, the POS terminal 132 can identify a product by the barcode supplied by the manufacturer of the product, the tag number supplied by the merchant, selected from a list by the merchant operating the POS terminal 132, or any other method utilized to identify products. In method 200 of FIG. 2, the POS terminal 132 can install and store product metadata from the PMS 150. In method 300, the POS terminal 132 instead can decline to install product metadata into the POS terminal 132 due to a variety of factors such as, but not limited to, inadequate data storage space, security concerns, fast changing inventory, or other factors.

Method 300 has many similar elements to method 200. Block 220 through block 245 of method 300 are substantially similar to the like-numbered blocks 220 through 235 of method 200, referenced in FIG. 2 and described above.

Referring back to method 200 in FIG. 2, in block 237 the EA 115 can request product identification and product metadata from the POS terminal 132. The POS terminal 132 can transmit product identification and product metadata to the EA 115 on the user device 110. In method 300 of FIG. 3, in block 337, the EA 115 can make the request for the product identification and the product metadata from the POS terminal 132; however, the POS terminal 132 instead transmits only the product information to the EA 115. In certain embodiments, the POS terminal 132 can supply the EA 115 with instructions to gather the product metadata from a website or other online location of the PMS server 151.

Block 240 and block 245 of method 300 are substantially similar to the like-numbered blocks 240 through 245 of method 200, referenced in FIG. 2 and described above.

In method 300, following the "YES" branch of block 245 to block 355, the EA 115 can transmit an endorsement and product identification to the SNW 163. With no product metadata available, the EA 115 can further transmit the product identification to the PMS 150 to request product metadata be sent to the SNW 163. The EA 115 may gather the online location of the PMS 150 from the barcode or other identifier of the product. In certain embodiments, the POS terminal 132 can supply the EA 115 with instructions to gather the product metadata from a website or other online location of the PMS server 151. The transmissions between the EA 115, the SNW 163, and the PMS 150 can be made via any available technology including, but not limited to, an Internet connection via the network 105, text, email, or a cellular connection.

Following the "NO" branch of block 245, the method 300 ends.

In block 360, the PMS 150 responds to the communication from the EA 115 and supplies the SNW 163 and the EA 115 with product metadata.

In block 365, the SNW 163 displays the endorsement of the product on the profile page of the user 101. Each SNW 163 can display endorsements in the preferred manner of that SNW 163. The endorsement display by the SNW 163 can employ as much or as little of the transmitted information as the SNW 163 chooses. For example, an SNW 163 can display the endorsement on the profile page of the user 101 and include any or all of the product metadata supplied by the EA 115 and the PMS 150 including videos, games, coupons, or other suitable marketing data. An SNW 163 can choose to only include a picture of the product or a link to the product's website or simply a list of endorsed products.

Figure 4:
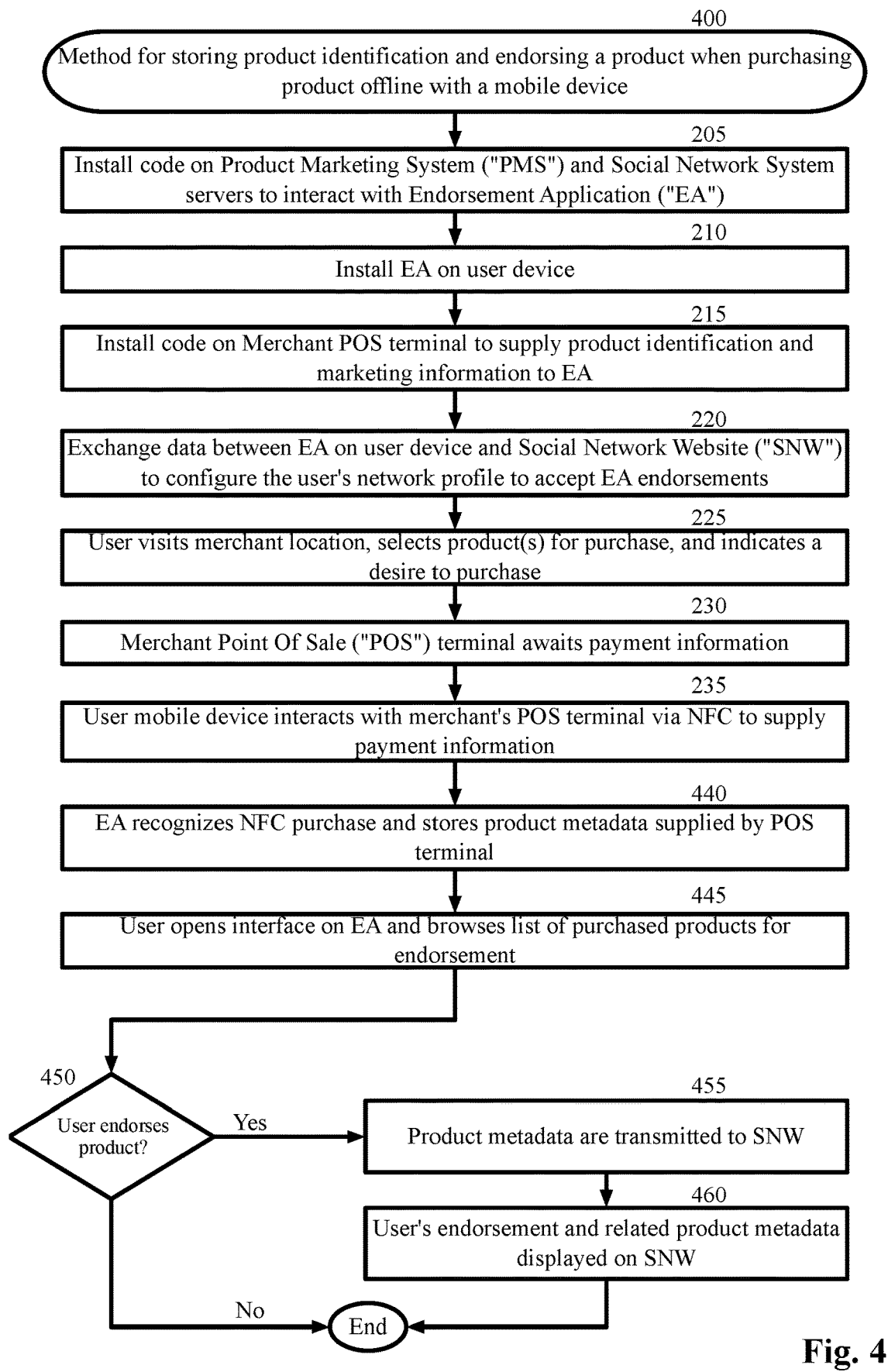
FIG. 4 is a block flow diagram depicting a method for endorsing a product purchased in an offline transaction, wherein the product data is stored in the mobile device for later endorsement, in accordance with certain exemplary embodiments.

FIG. 4 is a flow chart depicting a method 400 for storing product identification and for endorsing a product when purchasing the product offline with a mobile device, in accordance with certain exemplary embodiments.

Method 400 has many similar elements to method 200. Block 205 through block 235 of method 300 are substantially similar to the like-numbered blocks 205 through 235 of method 200, referenced in FIG. 2 and described above.

Referring back to FIG. 2, in block 240 of method 200, the EA 115 on the user device 110 recognizes that the user device 110 has been used to make a purchase and offers the user 101 an opportunity to endorse the product on the SNW 163 of the user 101. In block 440 of method 400, the EA 115 can instead recognize that the user device 110 has been used to make a purchase and store the product data and the product metadata supplied by the POS terminal 132 on the user device 110 for later review. The user device 110 can store the data in the EA 115 or in any other location on the user device 110 accessible by the EA 115. Alternatively, the EA 115 may store the product metadata on the user account on the SNW 163, on the digital wallet 111 account, or on any other device or server accessible by the user device 110. In certain embodiments, the POS terminal 132 can supply the EA 115 with instructions to gather the product metadata from a website or other online location of the PMS server 151.

In block 445, a user 101 can open the user interface system of the EA 115 and browse a list of purchased products. The user 101 can maintain the list integrity by limiting the number of items retained on the list, limiting the list to only items of a certain value, manually deleting items, or other suitable guidelines to enable the list to be useful to the user.

In block 450, the user 101 decides whether to endorse one or more items from the list of purchased items displayed by the EA 115. If the user 101 chooses to endorse an identified product, the method 400 follows the "YES" branch to block 455. Otherwise, the method 400 follows the "NO" branch and the method 400 ends.

Following the "YES" branch of block 450 to block 455, the EA 115 transmits a product endorsement to the SNW 163. With the endorsement, the EA 115 can transmit the product identification and the product metadata to the SNW 163. The transmission can be made via any available technology including, but not limited to, an Internet connection via the network 105, text, email, or a cellular connection.

In block 460, the SNW 163 can display the endorsement of the product on the profile page of the user 101. Each SNW 163 can display endorsements in the preferred manner of that SNW 163. The endorsement display by the SNW 163 can employ as much or as little of the transmitted information as the SNW 163 chooses. For example, an SNW 163 can display the endorsement on the profile page of the user 101 and include any or all of the product metadata supplied by the EA 115 and the PMS 150 including videos, games, coupons, or other suitable marketing data. Conversely, an SNW 163 can choose to limit the endorsement to as little as a picture of the product or a link to the product's website or simply a list of endorsed products.

Figure 5:
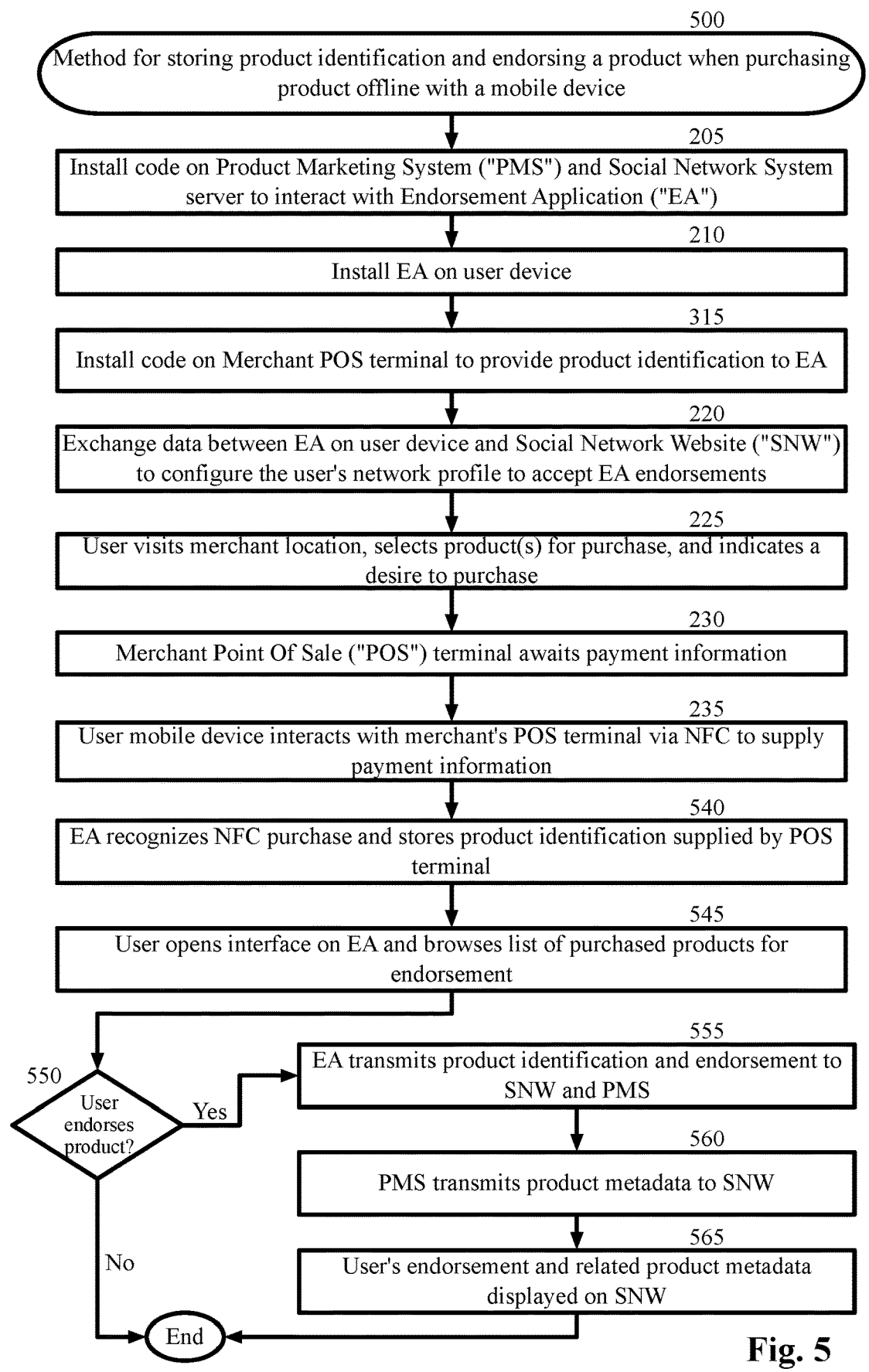
FIG. 5 is a block flow diagram depicting a method for endorsing a product purchased in an offline transaction, wherein the product data is stored in the mobile device for later endorsement according to an alternate exemplary embodiment.

FIG. 5 is a flow chart depicting a method 500 for storing product identification and endorsing a product when purchasing a product via NFC with a mobile device, in accordance with certain exemplary embodiments.

Method 500 has many similar elements to method 300. Block 205 through block 235 of method 500 are substantially similar to the like-numbered blocks 205 through 235 of method 300, referenced in FIG. 3 and described above.

In block 540 of method 500, the EA 115 recognizes that the user device 110 has been used to make a purchase and stores the product identification supplied by the POS terminal 132 on the user device 110 for later review. The user device 110 can store the data in the EA 115 or in any other location on the user device 110 accessible by the EA 115. Alternatively, the EA 115 may store the data on the user account on the SNW 163, in the digital wallet 111 account or on any other device or server accessible by the user device 110. Additionally, the EA 115 can recognize that the POS terminal 132 has no product metadata to supply.

In certain embodiments, the POS terminal 132 can supply the EA 115 with instructions to gather the product metadata from a website or other online location of the PMS server 151. In an alternate embodiment, the EA 115 may gather the product information from the barcode or other product identifier and determine the online location of the product metadata from the product identifier.

In block 545, a user 101 opens the user interface system of the EA 115 and browses a list of purchased products. The user 101 can maintain the list integrity by limiting the number of items retained on the list, limiting the list to only items of a certain value, manually deleting items, or other suitable guidelines to enable the list to be useful to the user.

In block 550, the user 101 decides whether to endorse one or more items from the list of purchased items displayed by the EA 115. If the user 101 chooses to endorse an identified product, the method 500 follows the "YES" branch to block 555. Otherwise, the method 500 follows the "NO" branch and the method 500 ends.

Following the "YES" branch of block 550 to block 555, the EA 115 transmits an endorsement and product identification to the SNW 163. With no product metadata available, the EA 115 can further transmit the product identification to the PMS 150 to request product metadata be sent to the SNW 163. The transmissions between the EA 115, the SNW 163, and the PMS 150 can be made via any available technology including, but not limited to, an Internet connection via the network 105, text, email, or a cellular connection.

In block 560, the PMS 150 responds to the communication from the EA 115 and supplies the SNW 163 and the EA 115 with product metadata.

In block 565, the SNW 163 displays the endorsement of the product on the profile page of the user 101. Each SNW 163 can display endorsements in the preferred manner of that SNW 163. The endorsement display by the SNW 163 can employ as much or as little of the transmitted information as the SNW 163 chooses. For example, an SNW 163 can display the endorsement on the profile page of the user 101 and include any or all of the product metadata supplied by the EA 115 and the PMS 150 including videos, games, coupons, or other suitable marketing data. Conversely, an SNW 163 can choose to limit the endorsement to as little as a picture of the product or a link to the product's website or simply a list of endorsed products.

GENERAL

Users can, in appropriate circumstances, limit or otherwise affect the operation of the features disclosed in the specification. For example, users can be given an initial opportunity to opt-in or opt-out of the collection or use of certain data or the activation of certain features. In addition, a user can change the manner in which the features are employed, including for situations in which a user can have concerns regarding his privacy. Instructions can be provided to users to notify the users regarding policies about the use of information, including personally identifiable information and receipt information, and manners in which the users can affect such use of information.

One or more aspects of the invention can comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein can be performed by hardware, software, or a combination thereof, as can be embodied in one or more computing systems. Moreover, any reference to an act being performed by a computer should not be construed as being performed by a single computer as more than one computer can perform the act.

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method to create online endorsements for offline product purchases, comprising:
   receiving, by an endorsement application on a computing device, product identification, the product identification being associated with a product purchased in a purchase transaction at a point of sale system at a physical location of a merchant, the product identification being received from the point of sale system;
   receiving, by the endorsement application on the computing device, product metadata associated with the product identification, the product metadata being received from at least one of the point of sale system or a product marketing system;
   communicating, by the endorsement application on the computing device, a request to a user via a user interface of the computing device to endorse the product on an electronic social network in response to receiving the product identification;
   receiving, by the endorsement application on the computing device, an indication from the user via the user interface to endorse the product; and
   communicating, by the endorsement application on the computing device, the product identification and the product metadata to the electronic social network with instructions to display an endorsement of the product on a user profile associated with the user on the electronic social network in response to receiving the indication to endorse the product.

2. The method of claim 1, wherein the product identification and the product metadata are received during the purchase transaction, and
   wherein the request is communicated to the user via the user interface during the purchase transaction.

3. The method of claim 1, wherein the request is communicated to the user via the user interface after the purchase transaction.

4. The method of claim 1, further comprising storing the product identification and the product metadata,
   wherein communicating the request to the user via the user interface comprises presenting on the user interface a list of products purchased previously, including the product, for selection for endorsement.

5. The method of claim 1, further comprising notifying the product marketing system corresponding to the product that the product has been endorsed upon receiving the indication to endorse the product.

6. The method of claim 5, further comprising receiving additional product marketing information for the product from the product marketing system upon receiving the indication to endorse the product.

7. The method of claim 1, wherein the computing device conducts the purchase transaction via near field communication with the point of sale system.

8. The method of claim 1, wherein the computing device conducts the purchase transaction via a Bluetooth communication with the point of sale system.

9. The method of claim 1, wherein the computing device is a mobile phone.

10. A computer program product, comprising:
a non-transitory computer-readable medium having computer-executable program code embodied thereon that when executed by a computer cause the computer to create online endorsements for offline product purchases, the computer-executable program code comprising program code to:
- receive product identification, the product identification being associated with a product purchased in a purchase transaction conducted at a point of sale system at a physical location of a merchant, the product identification being received from the point of sale system;
- receive product metadata associated with the product identification, the product metadata being received from at least one of the point of sale system or a product marketing system;
- communicate a request to a user via a user interface associated with the computer to endorse the product on an electronic social network in response to receiving the product identification;
- receive an indication from the user via the user interface to endorse the product; and
- communicate the product identification and the product metadata to the electronic social network with instructions to display an endorsement of the product on a user profile associated with the user on the electronic social network in response to receiving the indication to endorse the product.

11. The computer program product of claim 10, wherein the product identification and the product metadata are received from the point of sale system.

12. The computer program product of claim 10, wherein the product identification and the product metadata are received during the purchase transaction, and wherein the request to endorse the product is communicated to the user via the user interface during the purchase transaction.

13. The computer program product of claim 10, wherein the request to endorse the product is communicated to the user via the user interface after the purchase transaction.

14. The computer program product of claim 10, wherein communicating the request to the user via the user interface comprises presenting an endorsement feature via the user interface for the user to interact with to request endorsement of the product on the electronic social network.

15. The computer program product of claim 10, wherein the computer-executable program code further comprises program code to:
store the product identification; and
present, on the user interface, a list of products purchased previously, including the product, for selection for endorsement.

16. The computer program product of claim 10, wherein the computer-executable program code further comprises program code to notify the product marketing system corresponding to the product that the product has been endorsed.

17. The computer program product of claim 10, wherein the computer-executable program code further comprises program code to receive the product metadata for the product from the product marketing system.

18. The computer program product of claim 10, wherein the purchase transaction comprises a near field communication with the point of sale system or a Bluetooth communication with the point of sale system.

19. The computer program product of claim 10, wherein the computer-executable program code further comprises program code to receive the product metadata from the point of sale system.

20. A system to create online endorsements for offline product purchases, comprising:
an application configured to execute on a computer to:
- receive product identification, the product identification being associated with a product purchased in a transaction conducted at a point of sale system at a physical location of a merchant, the product identification being received from the point of sale system;
- receive product metadata associated with the product identification, the product metadata being received from at least one of the point of sale system or a product marketing system
- communicate a request to a user via a user interface of the computer to endorse the product on an electronic social network in response to receiving the product identification;
- receive an indication from the user via the user interface to endorse the product on the electronic social network; and
- communicate the product identification and the product metadata to the electronic social network with instructions to display an endorsement of the product on a user profile associated with the user on the electronic social network in response to receiving the indication to endorse the product.

* * * * *